US012621857B2

(12) United States Patent
Yang

(10) Patent No.: US 12,621,857 B2
(45) Date of Patent: May 5, 2026

(54) METHOD FOR WIRELESS TRANSMISSION, COMMUNICATION DEVICE AND NON-TRANSITORY COMPUTER STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 415 days.

(21) Appl. No.: 18/039,226

(22) PCT Filed: Nov. 27, 2020

(86) PCT No.: PCT/CN2020/132423
§ 371 (c)(1),
(2) Date: May 27, 2023

(87) PCT Pub. No.: WO2022/110057
PCT Pub. Date: Jun. 2, 2022

(65) Prior Publication Data
US 2023/0422291 A1 Dec. 28, 2023

(51) Int. Cl.
*H04W 72/56* (2023.01)
*H04W 72/40* (2023.01)

(52) U.S. Cl.
CPC .......... *H04W 72/56* (2023.01); *H04W 72/40* (2023.01)

(58) Field of Classification Search
CPC ............................. H04W 72/56; H04W 72/40
See application file for complete search history.

(56) References Cited

U.S. PATENT DOCUMENTS

| | | | |
|---|---|---|---|
| 10,834,747 | B2 | 11/2020 | Lu et al. |
| 2020/0045724 | A1* | 2/2020 | Lu ........................ H04W 72/121 |
| 2020/0275244 | A1 | 8/2020 | Lee et al. |
| 2021/0022170 | A1 | 1/2021 | Lu et al. |
| 2022/0039080 | A1* | 2/2022 | Khoryaev ............. H04W 4/025 |

FOREIGN PATENT DOCUMENTS

| | | |
|---|---|---|
| CN | 109891987 A | 6/2019 |
| CN | 110622601 A | 12/2019 |
| CN | 110944390 A | 3/2020 |
| CN | 111386740 A | 7/2020 |
| CN | 111756508 A | 10/2020 |
| WO | 2015109544 A1 | 7/2015 |
| WO | 2020102191 A1 | 5/2020 |

OTHER PUBLICATIONS

International Search Report of PCT/CN2020/132423 dated Aug. 19, 2021 with English translation, (4p).
CNOA3 issued in Chinese Application No. 202080003603.0 dated Jun. 8, 2022 with English translation, (11p).

* cited by examiner

*Primary Examiner* — Won Tae C Kim
(74) *Attorney, Agent, or Firm* — Arch & Lake LLP; Hao Tan; Shen Wang

(57) ABSTRACT

The embodiments of the present disclosure provide a method for wireless transmission method, which is performed by a terminal. The method includes: determining, according to at least one of a priority of data and a priority of a ranging signal, a transmission operation on an overlapping resource location; wherein a resource location for transmitting the data and a resource location for transmitting the ranging signal overlap at the overlapping resource location.

20 Claims, 7 Drawing Sheets base station/terminal | terminal step 41: determining, in response to the priority of the data being lower than a first priority threshold and the priority of the ranging signal being higher than a second priority threshold, that the ranging signal is transmitted on the overlapping resource location and the data is not transmitted on the overlapping resource location; or, determining, in response to the priority of the data being higher than a first priority threshold and the priority of the ranging signal being lower than a second priority threshold, that the ranging signal is not transmitted at the overlapping resource location and the data is transmitted at the overlapping resource location; or, determining, in response to the priority of the data being higher than a first priority threshold and the priority of the ranging signal being higher than a second priority threshold, that the ranging signal is transmitted on the overlapping resource location and the data is not transmitted on the overlapping resource location; or, determining, in response to the priority of the data being higher than a first priority threshold and the priority of the ranging signal being higher than a second priority threshold, that the ranging signal is not transmitted at the overlapping resource location and the data is transmitted at the overlapping resource location; or, determining, in response to the priority of the data being lower than a first priority threshold and the priority of the ranging signal being lower than a second priority threshold, that the ranging signal is transmitted on the overlapping resource location and the data is not transmitted on the overlapping resource location; or, determining, in response to the priority of the data being lower than a first priority threshold and the priority of the ranging signal being lower than a second priority threshold, that the ranging signal is not transmitted at the overlapping resource location and the data is transmitted at the overlapping resource location wireless communication

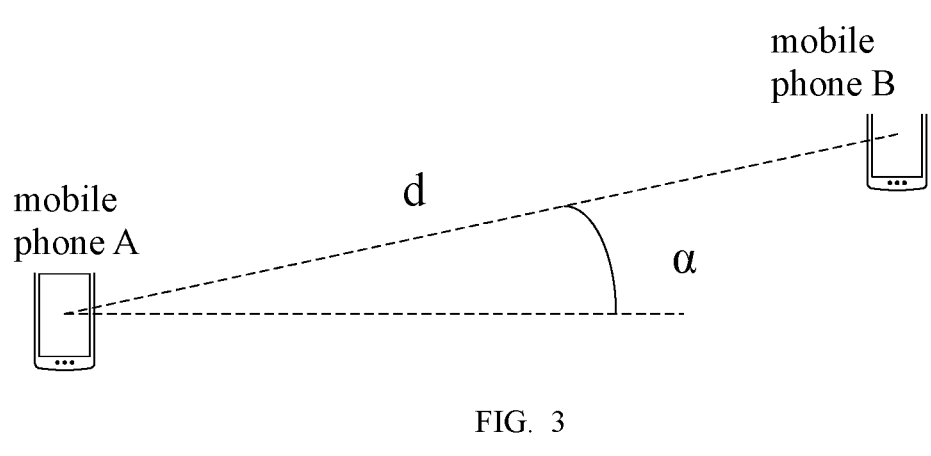

FIG. 3

| base station/terminal | | terminal |
|---|---|---| step 41: determining, in response to the priority of the data being lower than a first priority threshold and the priority of the ranging signal being higher than a second priority threshold, that the ranging signal is transmitted on the overlapping resource location and the data is not transmitted on the overlapping resource location; or, determining, in response to the priority of the data being higher than a first priority threshold and the priority of the ranging signal being lower than a second priority threshold, that the ranging signal is not transmitted at the overlapping resource location and the data is transmitted at the overlapping resource location; or, determining, in response to the priority of the data being higher than a first priority threshold and the priority of the ranging signal being higher than a second priority threshold, that the ranging signal is transmitted on the overlapping resource location and the data is not transmitted on the overlapping resource location; or, determining, in response to the priority of the data being higher than a first priority threshold and the priority of the ranging signal being higher than a second priority threshold, that the ranging signal is not transmitted at the overlapping resource location and the data is transmitted at the overlapping resource location; or, determining, in response to the priority of the data being lower than a first priority threshold and the priority of the ranging signal being lower than a second priority threshold, that the ranging signal is transmitted on the overlapping resource location and the data is not transmitted on the overlapping resource location; or, determining, in response to the priority of the data being lower than a first priority threshold and the priority of the ranging signal being lower than a second priority threshold, that the ranging signal is not transmitted at the overlapping resource location and the data is transmitted at the overlapping resource location wireless communication

METHOD FOR WIRELESS TRANSMISSION, COMMUNICATION DEVICE AND NON-TRANSITORY COMPUTER STORAGE MEDIUM

CROSS-REFERENCE TO RELATED APPLICATION

The present disclosure is the U.S. national phase of PCT Patent Application No. PCT/CN2020/132423 filed on Nov. 27, 2020, the entire contents of which are incorporated herein by reference for all purposes.

BACKGROUND

In order to support direct communication between terminals, a sidelink (direct link) communication manner has been introduced. In the sidelink communication manner, a communication interface for communication between terminals is PC-5. Sidelink communication is communication that is based on a time division transmission manner, and the terminal unable to simultaneously send and receive data or a reference signal on the sidelink. Moreover, the sidelink communication manner multiplexes an uplink of a cellular mobile network to send a resource, and the terminal cannot perform uplink data sending and sidelink transmission simultaneously.

SUMMARY

The present disclosure relates, but is not limited, to a technical field of wireless communications, and more particularly to a method for wireless transmission, an apparatus, a communication device, and a storage medium.

According to a first aspect of the present disclosure, a method for wireless transmission is provided, performed by a terminal, wherein the method includes:

determining, according to at least one of a priority of data and a priority of a ranging signal, a transmission operation on an overlapping resource location; wherein a resource location for transmitting the data and a resource location for transmitting the ranging signal overlap at the overlapping resource location.

According to a second aspect of the present disclosure, a communication device is provided and includes:

an antenna;

a memory; and a processor, connected to the antenna and the memory respectively, configured to control transmission and reception of the antenna by executing a computer executable instruction stored on the memory, wherein the processor is configured to:

determine, according to at least one of a priority of data and a priority of a ranging signal, a transmission operation on an overlapping resource location; wherein a resource location for transmitting the data and a resource location for transmitting the ranging signal overlap at the overlapping resource location.

According to a third aspect of the present disclosure, a non-transitory computer storage medium is provided, wherein the computer storage medium stores a computer executable instruction, and when the computer executable instruction is executed by a processor, the processor is configured to:

determine, according to at least one of a priority of data and a priority of a ranging signal, a transmission operation on an overlapping resource location; wherein a resource location for transmitting the data and a resource location for transmitting the ranging signal overlap at the overlapping resource location.

BRIEF DESCRIPTION OF THE DRAWINGS

FIG. 3 is a schematic diagram illustrating a scenario of relative positioning between terminals according to an embodiment.

FIG. 4 is a flowchart illustrating a method for wireless transmission according to an embodiment.

DETAILED DESCRIPTION

Exemplary embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following embodiments do not represent all implementations consistent with the present disclosure. Instead, they are merely examples of apparatuses and methods consistent with some aspects of the disclosure as described in the appended claims.

The terms in embodiments of the present disclosure are only for the purpose of describing specific embodiments, and are not intended to limit embodiments of the present disclosure. The singular forms of "a" and "the" in embodiments of the present disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second and third may be used in embodiments of the present disclosure to describe various information, the information should not be limited to these terms. These terms are only used to distinguish the same type of information from each other. For example, without departing from the scope of the present disclosure, the first information may also be referred to as the second information, and similarly, the second information may also be referred to as the first information.

In different contexts, the term "if" used herein is interpreted as "when" or "upon" or "in response to determining".

For the purpose of brevity and easy understanding, the terms "greater than" or "less than" may be used in the disclosure to characterize the value relationship. However, for those skilled in the art, it may be understood that the term "greater than" also covers the meaning of "greater than or equal to", and the term "less than" also covers the meaning of "less than or equal to".

A relative positioning technology is used to determine a relative position between two terminals. In the relative positioning technology, a terminal sends a ranging signal on a sidelink, and the terminal may calculate the relative position between two terminals based on a time difference and a phase difference between the ranging signals sent by a plurality of antennas. However, when the relative positioning is performed, if the terminal is sending the uplink data or sends data on the sidelink, the ranging signal cannot be received, which may easily lead to a failure of the relative positioning between the terminals.

Figure 1:
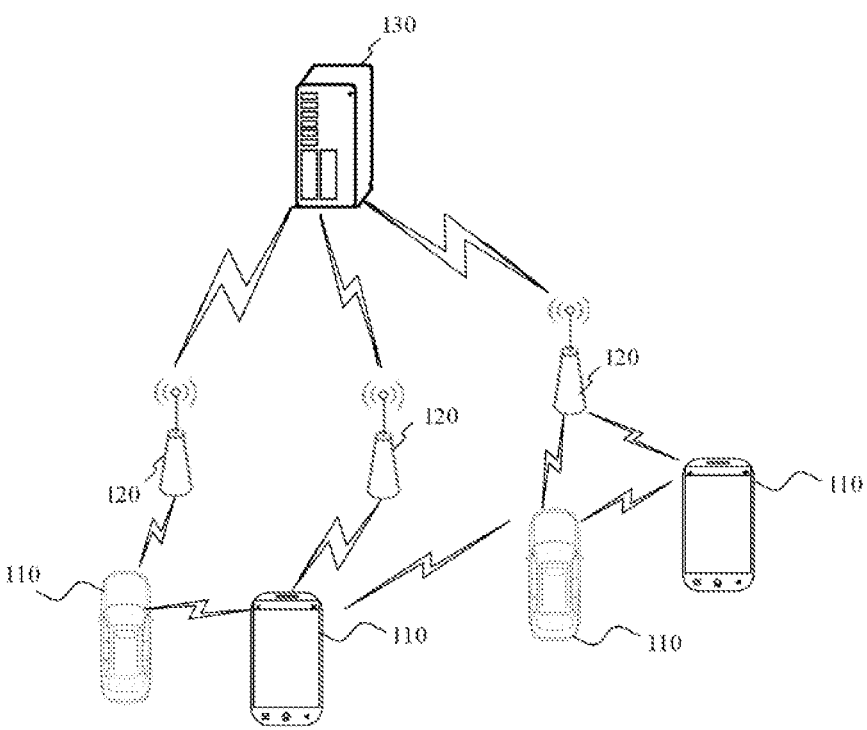
FIG. 1 is a schematic diagram of architecture of a wireless communication system according to an embodiment.

Please refer to FIG. 1, FIG. 1 illustrates a schematic diagram of architecture of a wireless communication system provided by an embodiment of the present disclosure. As illustrated in FIG. 1, the wireless communication system is a communication system based on cellular mobile communication technology. The wireless communication system may include several user equipment 110 and several base stations 120.

The user equipment 110 may be a device that provides at least one of voice and data connectivity to a user. The user equipment 110 may communicate with one or more core networks through radio access network (RAN). The user equipment 110 may be an Internet of Things user equipment, such as a sensor device, a mobile phone (or "cellular" phone) and a computer with the Internet of Things user equipment, such as fixed, portable, pocket, handheld, computer built-in or on-board apparatus. For example, a station (STA), a subscriber unit, a subscriber station, a mobile station, a mobile, a remote station, an access point, a remote terminal, an access terminal, a user terminal, a user agent, a user device, or a user equipment. Alternatively, the user equipment 110 may also be a device of an unmanned aerial vehicle. Alternatively, the user equipment 110 may also be an on-board device, for example, an onboard computer with a wireless communication function, or a wireless user equipment externally connected to the onboard computer. Alternatively, the user equipment 110 may also be a roadside device, for example, a street lamp, a signal light or other roadside devices with the wireless communication function.

The base station 120 may be a network-side device in the wireless communication system. The wireless communication system may be the 4th generation mobile communication (4G) system, also called as a Long Term Evolution (LTE) system. Alternatively, the wireless communication system may also be a 5G system, also called as a new radio (NR) system or a 5G NR system. Alternatively, the wireless communication system may also be the next generation system of the 5G system. An access network in the 5G system may be called as NGRAN (New Generation-Radio Access Network).

The base station 120 may be an evolutionary base station (eNB) used in the 4G system. Alternatively, the base station 120 may also be a base station (gNB) used a centralized distributed architecture in the 5G system. When using the centralized and distributed architecture, the base station 120 generally includes a central unit (CU) and at least two distributed units (DUs). The centralized unit is provided with protocol stacks of a packet data convergence protocol (PDCP) layer, a radio link control (RLC) protocol layer and a media access control (MAC) layer. The distribution unit is provided with a protocol stack of a physical (PHY) layer. Embodiments of the present disclosure do not define the specific implementation mode of the base station 120.

A wireless connection may be established between the base station 12 and the terminal 11 through a wireless air-interface. In different embodiments, the wireless air-interface may be a wireless air-interface based on the 4th generation mobile communication network technology (4G) standard. Alternatively, the wireless air-interface may be a wireless air-interface based on the 5th generation mobile communication network technology (5G) standard, for example, the wireless air-interface is a new radio. Alternatively, the wireless air-interface may also be a wireless air-interface based on the next generation mobile communication network technology standard relative to 5G.

In some embodiments, an E2E (End to End) connection, such as V2V (vehicle to vehicle) communication, V2I (vehicle to infrastructure) communication, V2P (vehicle to pedestrian) communication and other scenarios in vehicle to everything (V2X) communication, may also be established between the user equipment 110.

In some embodiments, the above user equipment may be regarded as a terminal in the following embodiments.

In some embodiments, the wireless communication system described above may also include a network management device 130.

Several base stations 120 are respectively connected to the network management device 130. The network management device 130 may be the core network device in the wireless communication system. For example, the network management device 130 may be a mobility management entity (MME) in an evolved packet core (EPC). Alternatively, the network management device may also be other core network devices, such as a serving gateway (SGW), a public data network gateway (PGW), a policy and charging rules function (PCRF), or a home subscriber server (HSS), etc. Embodiments of the present disclosure do not define the implementation form of the network management device 130.

In order to facilitate the description of the technical solution described in any embodiment of the present disclosure, first, an application scenario of data transmission is illustrated.

In an embodiment, when there is an overlap between a sending resource location for sidelink communication between terminals and a sending resource location for communication between a terminal and a base station, the terminal needs to determine whether to send sidelink data or uplink data based on a priority of sending the sidelink data and a priority of sending the uplink data.

In an embodiment, if a priority parameter for sending the sidelink data is less than a first threshold of sending the sidelink data, and a priority parameter for sending the uplink data is greater than a second threshold of sending the uplink data, then the sidelink data is sent; otherwise, the uplink data is sent. Herein, the smaller the priority parameter, the higher the corresponding priority.

In an embodiment, the priority of the sidelink data is the highest priority among priorities of a plurality of logical channels that transmit the sidelink data. The priority of the uplink data is the highest priority among priorities of a plurality of logical channels that transmit the uplink data.

In an embodiment, each logical channel for transmitting data is correspondingly provided with one priority. The priority is used for scheduling the logical channel.

In an embodiment, the higher the priority corresponding to the logical channel, the logical channel is preferentially scheduled and used for data transmission.

In an embodiment, the priority may be configured by the base station.

In an embodiment, when the relative positioning between the terminals is performed, a startup terminal sends an initial ranging signal. A feedback terminal feeds back a feedback ranging signal to the startup terminal after receiving the initial ranging signal. After receiving the feedback ranging signal, the startup terminal calculates a relative distance between the two terminals based on a time difference between sending the initial ranging signal and receiving the feedback ranging signal. Moreover, the terminal may also calculate a relative angle by measuring an angle of arrival (AOA) of the feedback ranging signal. The relative positioning between terminals may be performed through the relative distance and the relative angle.

Figure 2:
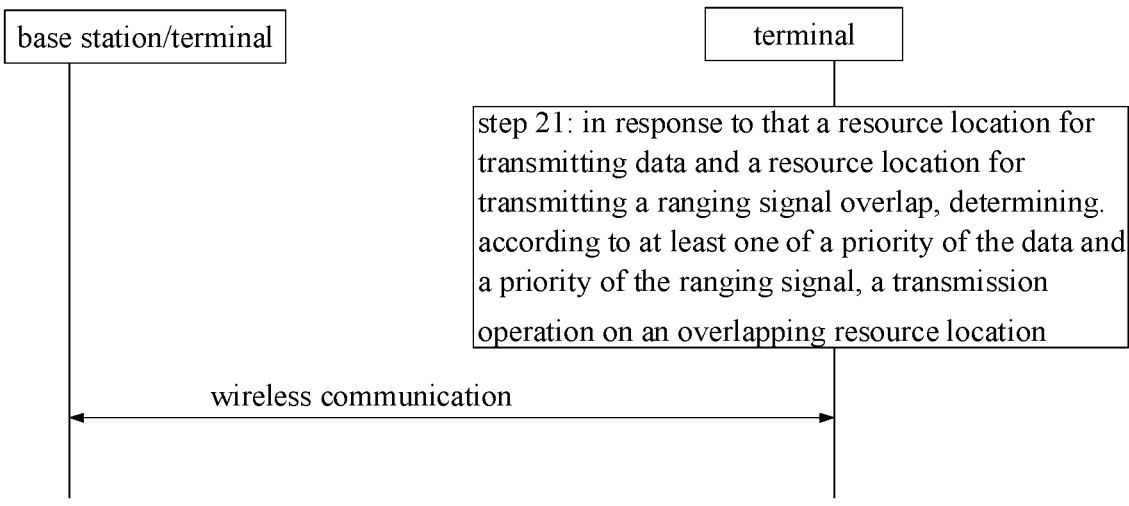
FIG. 2 is a flowchart illustrating a method for wireless transmission according to an embodiment.

As shown in FIG. 2, the embodiment provides a method for wireless transmission, which is performed by a terminal and includes step 21:

step 21: in response to that a resource location for transmitting data and a resource location for transmitting a ranging signal overlap, according to at least one of a priority of the data and a priority of the ranging signal, a transmission operation on an overlapping resource location is determined.

In some embodiments, the transmitting the data may be that the terminal receives or sends the data. The transmitting the ranging signal may be that the terminal receives or sends the ranging signal.

In an embodiment, the terminal transmitting the data may be that the data is transmitted between the terminal and a base station, for example, the terminal sending uplink data to the base station, or the terminal receiving downlink data that is sent by the base station to the terminal.

In an embodiment, the terminal transmitting the data may be that the data is transmitted between terminals, for example, a first terminal sending sidelink data to a second terminal, or a first terminal receiving data that is sent by a second terminal to the first terminal.

In an embodiment, the terminal transmitting the ranging signal may be that the terminal receives the ranging signal sent by a peer terminal, or the terminal sends the ranging signal to the peer terminal.

In some embodiments, the terminal may be, but not limited to, a mobile phone, a wearable device, an on-board terminal, a road side unit (RSU), a smart home terminal, an industrial sensing device, and/or a medical device, etc.

The base station is an interface device for terminal access to a network.

The base station may be various types of base stations, such as a base station of the third-generation mobile communication (3G) network, a base station of the fourth-generation mobile communication (4G) network, a base station of the fifth-generation mobile communication (5G) network, or other evolving base stations.

In some embodiments, the ranging signal is a reference signal used to measure a relative position between terminals.

In an embodiment, a wireless communication manner using a sidelink may be used to measure the relative position between the terminals.

In an embodiment, please refer to FIG. 3, a first terminal is terminal A, and a second terminal is terminal B. When relative positioning between the terminal A and the terminal B is performed, based on a sidelink wireless communication manner, the startup terminal A sends an initial ranging signal. The feedback terminal B feeds back a feedback ranging signal after receiving the initial ranging signal. The startup terminal A calculates a relative distance d between the terminal A and the terminal B based on a time difference between sending the initial ranging signal and receiving the feedback ranging signal. The terminal A calculates a relative angle α by measuring an angle of arrival (AOA) of the feedback ranging signal. The relative positioning between the terminal A and the terminal B is performed through the relative distance d and the relative angle α. The relative position between the first terminal A and the second terminal B is determined.

In an embodiment, the base station configures a resource location for transmitting data for the terminal.

In an embodiment, the resource location, for transmitting data, configured by the base station for the terminal may be a resource location for transmitting the data between the terminal and the base station.

In an embodiment, the resource location, for transmitting data, configured by the base station for the terminal may be a resource location for transmitting sidelink data between the terminal and the peer terminal.

In an embodiment, the base station configures a resource location for transmitting a ranging signal for the terminal.

In an embodiment, the resource location, for transmitting the ranging signal, configured by the base station for the terminal may be a resource location for transmitting the ranging signal between the terminal and the peer terminal.

In an embodiment, when the terminal needs to transmit sidelink data, the terminal may send a resource acquisition request to the base station, and receive resource scheduling information sent by the base station for the resource acquisition request. The resource scheduling information is used to assign a resource to the terminal for transmitting the sidelink data. The terminal may determine a resource location for transmitting the sidelink data based on the resource scheduling information. In this way, since the resource are scheduled by the base station in a unified manner, the base station may schedule the resource through a unified resource scheduling algorithm, which may timely reduce the interference between transmission channels caused by resource collisions when using sidelink wireless communication for data transmission between different terminals, and improve the quality of channel communication.

In an embodiment, when the terminal needs to transmit the sidelink data, the terminal may acquire a resource for transmitting the sidelink data from a pre-configured resource pool. The terminal determines a resource location for transmitting the sidelink data based on the resource acquired from the resource pool.

In an embodiment, when the terminal needs to transmit a ranging signal, the terminal may send a resource acquisition request to the base station, and receive resource scheduling information sent by the base station for the resource acquisition request. The resource scheduling information is used to assign a resource to the terminal for transmitting the ranging signal. The terminal may determine a resource location for transmitting the ranging signal based on the resource scheduling information. In this way, since the resource are scheduled by the base station in a unified manner, the base station may schedule the resource through a unified resource scheduling algorithm, which may timely reduce the interference between transmission channels caused by resource collisions when using sidelink wireless communication for ranging signal transmission between different terminals, and improve the quality of channel communication.

In an embodiment, when the terminal needs to transmit the ranging signal, the terminal may acquire a resource for transmitting the ranging signal from a pre-configured resource pool. The terminal determines a resource location for transmitting the ranging signal based on the resource acquired from the resource pool.

In an embodiment, when the relative positioning is performed, the relatively positioned peer terminal sends a radio resource control (RRC) message to the terminal, and the radio resource control (RRC) message carries a resource location of the ranging signal sent by the peer terminal. After receiving the radio resource control (RRC) message, the terminal may determine the resource location for the ranging signal sent by the peer terminal based on the radio resource control message.

In an embodiment, the resource location may be a location of a time-domain resource and/or a location of frequency-domain resource.

In an embodiment, the resource location for transmitting the data overlapping with the resource location for transmitting the ranging signal may be that the locations of the time-domain resources overlap, the locations of the frequency-domain resources overlap, and the location of the time-domain resource overlaps with the location of the frequency-domain resource.

In an embodiment, resource location overlap may be a partial overlap of the resource location or a complete overlap of the resource location.

In an embodiment, the priority of data may be indicated by a priority parameter.

In an embodiment, the smaller the priority parameter, the higher the priority of the data; the higher the priority parameter, the lower the priority of the data.

In an embodiment, when the priority parameter is less than a parameter threshold value, the priority of the data is greater than a priority threshold value; when the priority parameter is greater than a parameter threshold value, the priority of the data is less than a priority threshold value.

In an embodiment, the priority of the ranging signal may be indicated by a priority parameter of the ranging signal.

In an embodiment, the lower the priority parameter of the ranging signal, the higher the priority of the ranging signal; the higher the priority parameter of the ranging signal, the lower the priority of the ranging signal.

In an embodiment, when the priority parameter of the ranging signal is less than a parameter threshold value, the priority of the ranging signal is greater than the priority threshold value; when the priority parameter of the ranging signal is greater than the parameter threshold value, the priority of the ranging signal is less than the priority threshold value.

In an embodiment, a transmission operation on an overlapping resource location is determined based on a value relationship between the priority of the data and the priority threshold of the data.

In an embodiment, when the priority of data is greater than the priority threshold of data, the ranging signal is received on the overlapping resource location. When the priority of the data is less than the priority threshold of the data, the ranging signal is not received on the overlapping resource location.

In an embodiment, a transmission operation on an overlapping resource location is determined based on a value relationship between the priority of the ranging signal and the priority threshold of the ranging signal.

In an embodiment, when the priority of the ranging signal is greater than the priority threshold of the ranging signal, the ranging signal is received on the overlapping resource location. When the priority of the ranging signal is less than the priority threshold of the ranging signal, the ranging signal is not received on the overlapping resource location.

In an embodiment, the transmission operation on the overlapping resource location are determined based on a first value relationship between the priority of the data and the priority threshold of the data, as well as a second value relationship between the priority of the ranging signal and the priority threshold of the ranging signal.

In an embodiment, when the first value relationship is that the priority of the data is greater than the priority threshold of the data, and the second value relationship is that the priority of the ranging signal is greater than the priority threshold of the ranging signal, the ranging signal is received on the overlapping resource location.

In an embodiment, when the first value relationship is that the priority of the data is greater than the priority threshold of the data, and the second value relationship is that the priority of the ranging signal is less than the priority threshold of the ranging signal, the ranging signal is not received on the overlapping resource location.

In an embodiment, the transmission operation on the overlapping resource location is determined based on a value relationship between the priority of the data and the priority of the ranging signal.

In an embodiment, when the priority of the data is less than the priority of the ranging signal, the ranging signal is received on the overlapping resource location.

In an embodiment, when the priority of the data is greater than the priority of the ranging signal, the ranging signal is not received on the overlapping resource location.

In the embodiment of the present disclosure, the terminal may receive the ranging signals on the overlapping resource location based on the priority of the data and/or the priority of the ranging signal. Compared to the manner in which the ranging signal cannot be received on the overlapping resource location when the resource location for transmitting the data and the resource location for transmitting the ranging signal overlap, it may reduce the failure of the relative positioning between the terminal and the peer terminal caused by the terminal being unable to receive the ranging signal, and improve reliability of the relative positioning between the terminals.

In some embodiments, the method provided in the present disclosure may be performed separately or may be performed together with some methods or some methods in the related art.

In an embodiment, the data includes at least one of the following:

data transmitted through a Uu interface;

data transmitted through a sidelink.

The Uu interface is an interface between a UE and UMTS Terrestrial Radio Access Network (UTRAN).

In some embodiments, the data transmitted through the Uu interface may be data sent by the terminal to the base station based on a Uu interface protocol, or data sent by the base station to the terminal based on a Uu interface protocol.

In some embodiments, the data transmitted through the sidelink may be data sent by the peer terminal based on a sidelink protocol, or data sent by the terminal to the peer terminal based on a sidelink protocol.

As shown in FIG. 4, the embodiment provides a method for wireless transmission, wherein the method includes step 41:

step 41: in response to the priority of the data being lower than a first priority threshold and the priority of the ranging signal being higher than a second priority threshold, that the ranging signal is transmitted on the overlapping resource location and the data is not transmitted on the overlapping resource location is determined;

or, in response to the priority of the data being higher than a first priority threshold and the priority of the ranging signal being lower than a second priority threshold, that the ranging signal is not transmitted at the overlapping resource location and the data is transmitted at the overlapping resource location is determined;

or, in response to the priority of the data being higher than a first priority threshold and the priority of the ranging signal being higher than a second priority threshold, that the ranging signal is transmitted on the overlapping resource location and the data is not transmitted on the overlapping resource location is determined;

or, in response to the priority of the data being higher than a first priority threshold and the priority of the ranging signal being higher than a second priority threshold, that the ranging signal is not transmitted at the overlapping resource location and the data is transmitted at the overlapping resource location is determined;

or, in response to the priority of the data being lower than a first priority threshold and the priority of the ranging signal being lower than a second priority threshold, that the ranging signal is transmitted on the overlapping resource location and the data is not transmitted on the overlapping resource location is determined;

or, in response to the priority of the data being lower than a first priority threshold and the priority of the ranging signal being lower than a second priority threshold, that the ranging signal is not transmitted at the overlapping resource location and the data is transmitted at the overlapping resource location is determined.

In an embodiment, data is transmitted on one or a plurality of logical channels.

In an embodiment, each logical channel is correspondingly provided with one priority for logical channel scheduling. For example, a priority of a first logical channel is a first priority, and a priority of a second logical channel is a second priority.

In an embodiment, a logical channel with a high priority level is scheduled to transmit data prior to a logical channel with a low priority level.

In an embodiment, the priority of the logical channel is configured by the base station. For example, the base station may configure a priority of a first logical channel as a first priority, and the base station may configure a priority of a second logical channel as a second priority, where the first priority is greater than the second priority.

In an embodiment, the priority of the logical channel may be determined by a priority parameter of the logical channel. For example, when the priority parameter of the logical channel is set to "0", a corresponding priority of the logical channel is the first priority; when a priority parameter of the logical channel is set to "1", a corresponding priority of the logical channel is the second priority.

In an embodiment, the higher the value of the priority parameter of the logical channel, the lower the priority of the corresponding logical channel.

In an embodiment, when the value of the priority parameter of the logical channel is greater than the parameter threshold value, the priority of the logical channel is less than the priority threshold value.

In an embodiment, the highest priority among priorities of a plurality of logical channels is the priority of the data.

In an embodiment, the priority of the ranging signal may be indicated by a priority parameter of the ranging signal.

In an embodiment, the lower the priority parameter of the ranging signal, the higher the priority of the ranging signal; the higher the priority parameter of the ranging signal, the lower the priority of the ranging signal.

In an embodiment, when the priority parameter of the ranging signal is less than the parameter threshold value, the priority of the ranging signal is higher than the priority threshold value; when the priority parameter of the ranging signal is higher than the parameter threshold value, the priority of the ranging signal is less than the priority threshold value.

In an embodiment, at least one of the priority of the ranging signal, the first priority threshold, and the second priority threshold is:

received from a base station;

or, obtained from an access stratum (AS) of the terminal;

or, pre-configured.

In an embodiment, it may be a radio resource control (RRC) message, carrying the priority of the ranging signal, the first priority threshold, and/or the second priority threshold, received from the base station.

In an embodiment, when the terminal or the peer terminal initiates a ranging measurement between the terminals, the access stratum (AS) of the terminal is configured with the priority of the ranging signal, the first priority threshold, and/or the second priority threshold. In this way, the terminal may acquire the priority of the ranging signal, the first priority threshold, and/or the second priority threshold from the access stratum (AS) of the terminal.

In an embodiment, the priority of the ranging signal, the first priority threshold, and/or the second priority threshold are pre-configured in a storage region of the terminal, and the terminal may obtain the priority of the ranging signal, the first priority threshold, and/or the second priority threshold from the storage region.

In some embodiments, the method provided in the present disclosure may be performed separately or may be performed together with some methods or some methods in the related art.

Figure 5:
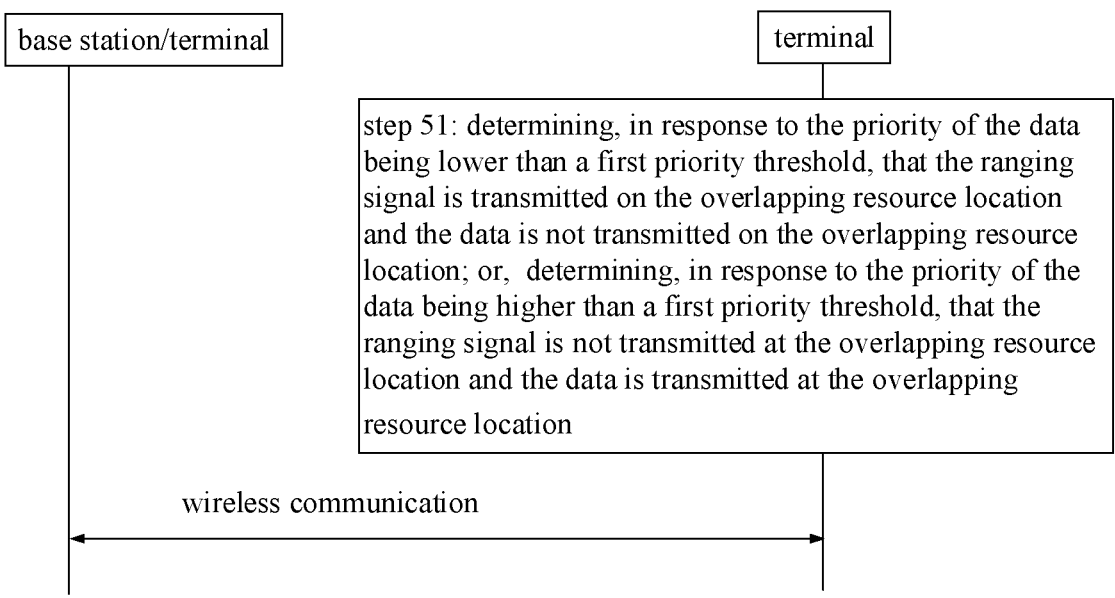
FIG. 5 is a flowchart illustrating a method for wireless transmission according to an embodiment.

As shown in FIG. 5, the embodiment provides the method for wireless transmission, wherein the method includes step 51:

step 51: in response to the priority of the data being lower than a first priority threshold, that the ranging signal is transmitted on the overlapping resource location and the data is not transmitted on the overlapping resource location is determined;

or, in response to the priority of the data being higher than a first priority threshold, that the ranging signal is not transmitted at the overlapping resource location and the data is transmitted at the overlapping resource location is determined.

In an embodiment, data is transmitted on one or a plurality of logical channels.

In an embodiment, each logical channel is correspondingly provided with one priority for logical channel scheduling. For example, a priority of a first logical channel is a first priority, and a priority of a second logical channel is a second priority. In some embodiments, a logical channel with a high priority level transmits data prior to a logical channel with a low priority level.

In an embodiment, the priority of the logical channel is configured by the base station. For example, the base station may configure a priority of a first logical channel as a first priority, and the base station may configure a priority of a second logical channel as a second priority, where the first priority is greater than the second priority.

In an embodiment, the priority of the logical channel may be determined by a priority parameter of the logical channel. For example, when the priority parameter of the logical channel is set to "0", a corresponding priority of the logical channel is the first priority; when a priority parameter of the logical channel is set to "1", a corresponding priority of the logical channel is the second priority.

In an embodiment, the higher the value of the priority parameter of the logical channel, the lower the priority of the corresponding logical channel.

In an embodiment, when the value of the priority parameter of the logical channel is greater than the parameter threshold value, the priority of the logical channel is less than the priority threshold value.

In an embodiment, the first priority threshold is:

received from a base station;

or, obtained from an access stratum (AS) of the terminal;

or, pre-configured.

In an embodiment, it may be a radio resource control (RRC) message, carrying the first priority threshold, received from the base station.

In an embodiment, when the terminal or the peer terminal initiates a ranging measurement between the terminals, the access stratum (AS) of the terminal is configured with the first priority threshold. In this way, the terminal may acquire the first priority threshold from the access stratum (AS) of the terminal.

In an embodiment, the first priority threshold is pre-configured in a storage region of the terminal, and the terminal may obtain the first priority threshold from the storage region.

In some embodiments, the method provided in the present disclosure may be performed separately or may be performed together with some methods or some methods in the related art.

Figure 6:
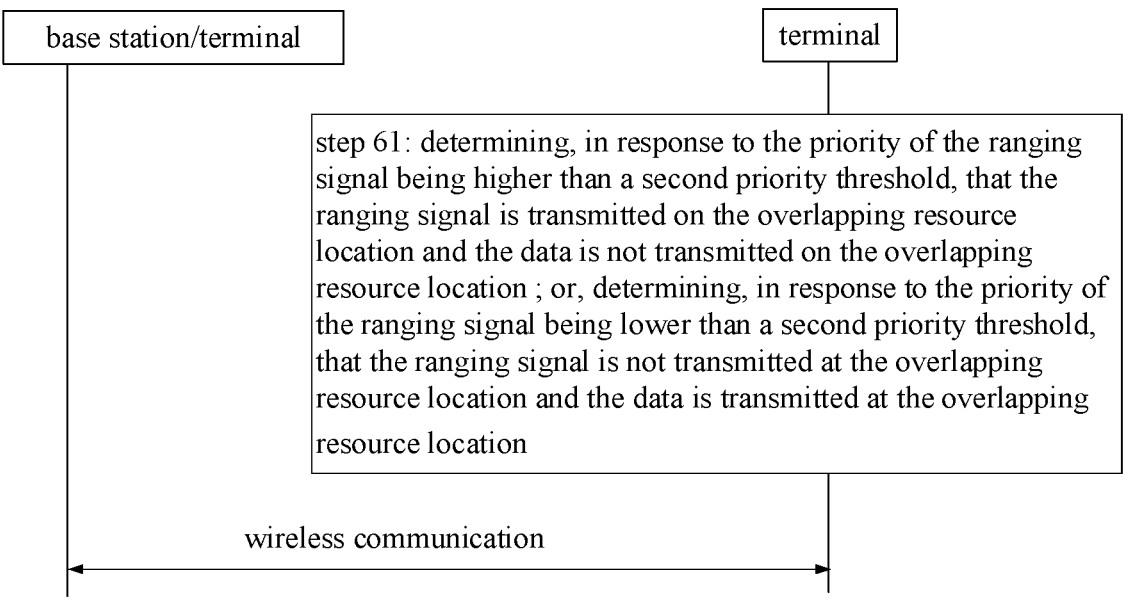
FIG. 6 is a flowchart illustrating a method for wireless transmission according to an embodiment.

As shown in FIG. 6, the embodiment provides a method for wireless transmission, wherein the method includes step 61:

step 61: in response to the priority of the ranging signal being higher than a second priority threshold, that the ranging signal is transmitted on the overlapping resource location and the data is not transmitted on the overlapping resource location is determined;

or, in response to the priority of the ranging signal being lower than a second priority threshold, that the ranging signal is not transmitted at the overlapping resource location and the data is transmitted at the overlapping resource location is determined.

In an embodiment, the priority of the ranging signal may be indicated by a priority parameter of the ranging signal.

In an embodiment, the lower the priority parameter of the ranging signal, the higher the priority of the ranging signal; the higher the priority parameter of the ranging signal, the lower the priority of the ranging signal.

In an embodiment, when the priority parameter of the ranging signal is less than a parameter threshold value, the priority of the ranging signal is greater than the priority threshold value; when the priority parameter of the ranging signal is greater than the parameter threshold value, the priority of the ranging signal is less than the priority threshold value.

In an embodiment, the second priority threshold is:

received from a base station;

or, obtained from an access stratum (AS) of the terminal;

or, pre-configured.

In an embodiment, it may be a radio resource control (RRC) message, carrying the second priority threshold, received from the base station.

In an embodiment, when the terminal or the peer terminal initiates a ranging measurement between the terminals, the access stratum (AS) of the terminal is configured with the second priority threshold. In this way, the terminal may acquire the second priority threshold from the access stratum (AS) of the terminal.

In an embodiment, the second priority threshold is pre-configured in a storage region of the terminal, and the terminal may obtain the second priority threshold from the storage region.

In some embodiments, the method provided in embodiments of the present disclosure may be performed separately or may be performed together with some methods or some methods in the related art.

Figure 7:
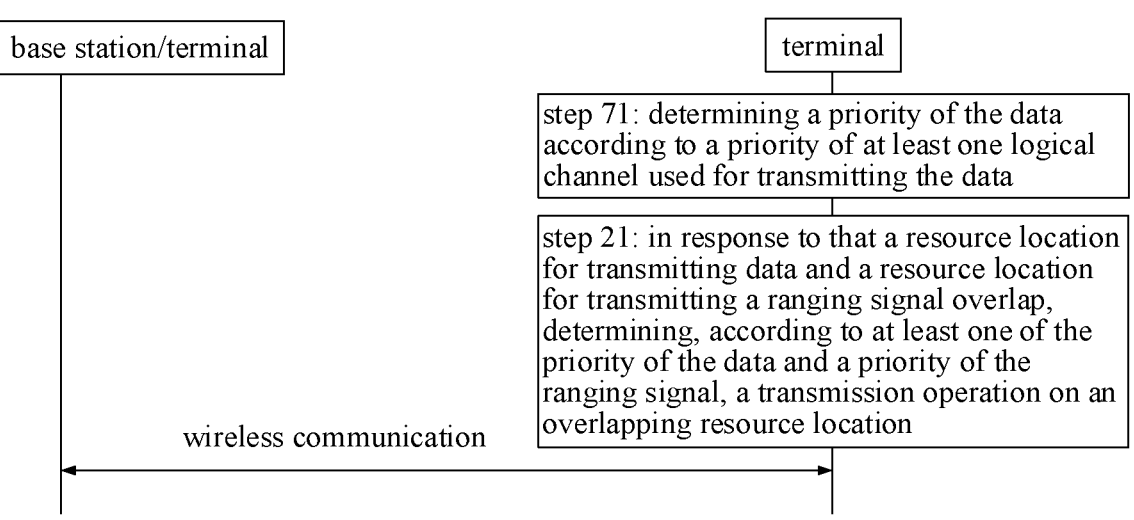
FIG. 7 is a flowchart illustrating a method for wireless transmission according to an embodiment.

As shown in FIG. 7, the embodiment provides a method for wireless transmission, wherein the method includes step 71:

step 71: the priority of the data is determined according to a priority of at least one logical channel used for transmitting the data.

In an embodiment, data is transmitted on one or a plurality of logical channels.

In an embodiment, each logical channel is correspondingly provided with one priority for logical channel scheduling. For example, a priority of a first logical channel is a first priority, and a priority of a second logical channel is a second priority.

In an embodiment, a logical channel with a high priority level is scheduled to transmit data prior to a logical channel with a low priority level.

In an embodiment, the priority of the logical channel is configured by the base station. For example, the base station may configure a priority of a first logical channel as a first priority, and the base station may configure a priority of a second logical channel as a second priority, where the first priority is greater than the second priority.

In an embodiment, the priority of the logical channel may be determined by a priority parameter of the logical channel. For example, when the priority parameter of the logical channel is set to "0", a corresponding priority of the logical channel is the first priority; when a priority parameter of the logical channel is set to "1", a corresponding priority of the logical channel is the second priority.

In an embodiment, the higher the value of the priority parameter of the logical channel, the lower the priority of the corresponding logical channel.

In an embodiment, when the value of the priority parameter of the logical channel is greater than the parameter threshold value, the priority of the logical channel is less than the priority threshold value.

In an embodiment, the highest priority among priorities of at least one of logical channels used for transmitting data is determined as the priority of the data. For example, three logical channels, namely, a first logical channel, a second logical channel, and a third logical channel, are used for transmitting data. A priority of the first logical channel is a first priority, a priority of the second logical channel is a second priority, and a priority of the third logical channel is a third priority. The first priority is higher than the second priority, and the second priority is higher than the third priority, and thus, the first priority is the priority of the data.

In an embodiment, at least one of the priority of the ranging signal, the first priority threshold, and the second priority threshold is:

received from a base station;

or, obtained from an access stratum (AS) of the terminal;

or, pre-configured.

In an embodiment, it may be a radio resource control (RRC) message, carrying the priority of the ranging signal, the first priority threshold, and/or the second priority threshold, received from the base station.

In an embodiment, when the terminal or the peer terminal initiates a ranging measurement between the terminal and the peer terminal, the access stratum (AS) of the terminal is configured with the priority of the ranging signal, the first priority threshold, and/or the second priority threshold. In this way, the terminal may acquire the priority of the ranging signal, the first priority threshold, and/or the second priority threshold from the access stratum (AS) of the terminal.

In an embodiment, the priority of the ranging signal, the first priority threshold, and/or the second priority threshold are pre-configured in a storage region of the terminal, and the terminal may obtain the priority of the ranging signal, the first priority threshold, and/or the second priority threshold from the storage region.

In some embodiments, the method provided in the present disclosure may be performed separately or may be performed together with some methods or some methods in the related art.

Figure 8:
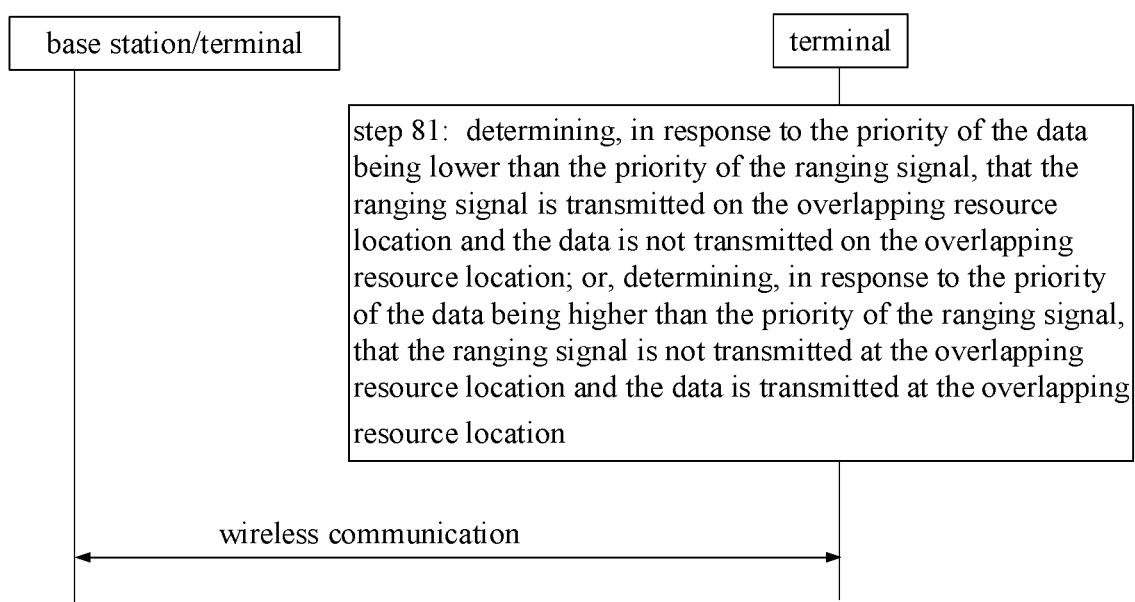
FIG. 8 is a flowchart illustrating a method for wireless transmission according to an embodiment.

As shown in FIG. 8, the embodiment provides a method for wireless transmission, wherein the method includes step 81:

step 81: in response to the priority of the data being lower than the priority of the ranging signal, that the ranging signal is transmitted on the overlapping resource location and the data is not transmitted on the overlapping resource location is determined;

or, in response to the priority of the data being higher than the priority of the ranging signal, that the ranging signal is not transmitted at the overlapping resource location and the data is transmitted at the overlapping resource location is determined.

In an embodiment, data is transmitted on one or a plurality of logical channels.

In an embodiment, each logical channel is correspondingly provided with one priority for logical channel scheduling. For example, a priority of a first logical channel is a first priority, and a priority of a second logical channel is a second priority. In some embodiments, a logical channel with a high priority level is scheduled and used to transmit data prior to a logical channel with a low priority level.

In an embodiment, the priority of the logical channel is configured by the base station. For example, the base station may configure a priority of a first logical channel as a first priority, and the base station may configure a priority of a second logical channel as a second priority, where the first priority is greater than the second priority.

In an embodiment, the priority of the logical channel may be determined by a priority parameter of the logical channel. For example, when the priority parameter of the logical channel is set to "0", a corresponding priority of the logical channel is the first priority; when a priority parameter of the logical channel is set to "1", a corresponding priority of the logical channel is the second priority.

In an embodiment, the higher the value of the priority parameter of the logical channel, the lower the priority of the corresponding logical channel.

In an embodiment, when the value of the priority parameter of the logical channel is greater than the parameter threshold value, the priority of the logical channel is less than the priority threshold value.

In an embodiment, the highest priority among priorities of a plurality of logical channels is the priority of the data.

In an embodiment, the priority of the ranging signal may be indicated by a priority parameter of the ranging signal.

In an embodiment, the lower the priority parameter of the ranging signal, the higher the priority of the ranging signal; the higher the priority parameter of the ranging signal, the lower the priority of the ranging signal.

In an embodiment, when the priority parameter of the ranging signal is less than the parameter threshold value, the priority of the ranging signal is higher than the priority threshold value; when the priority parameter of the ranging signal is higher than the parameter threshold value, the priority of the ranging signal is less than the priority threshold value.

In some embodiments, the method provided in the present disclosure may be performed separately or may be performed together with some methods or some methods in the related art.

Figures 9, 10:
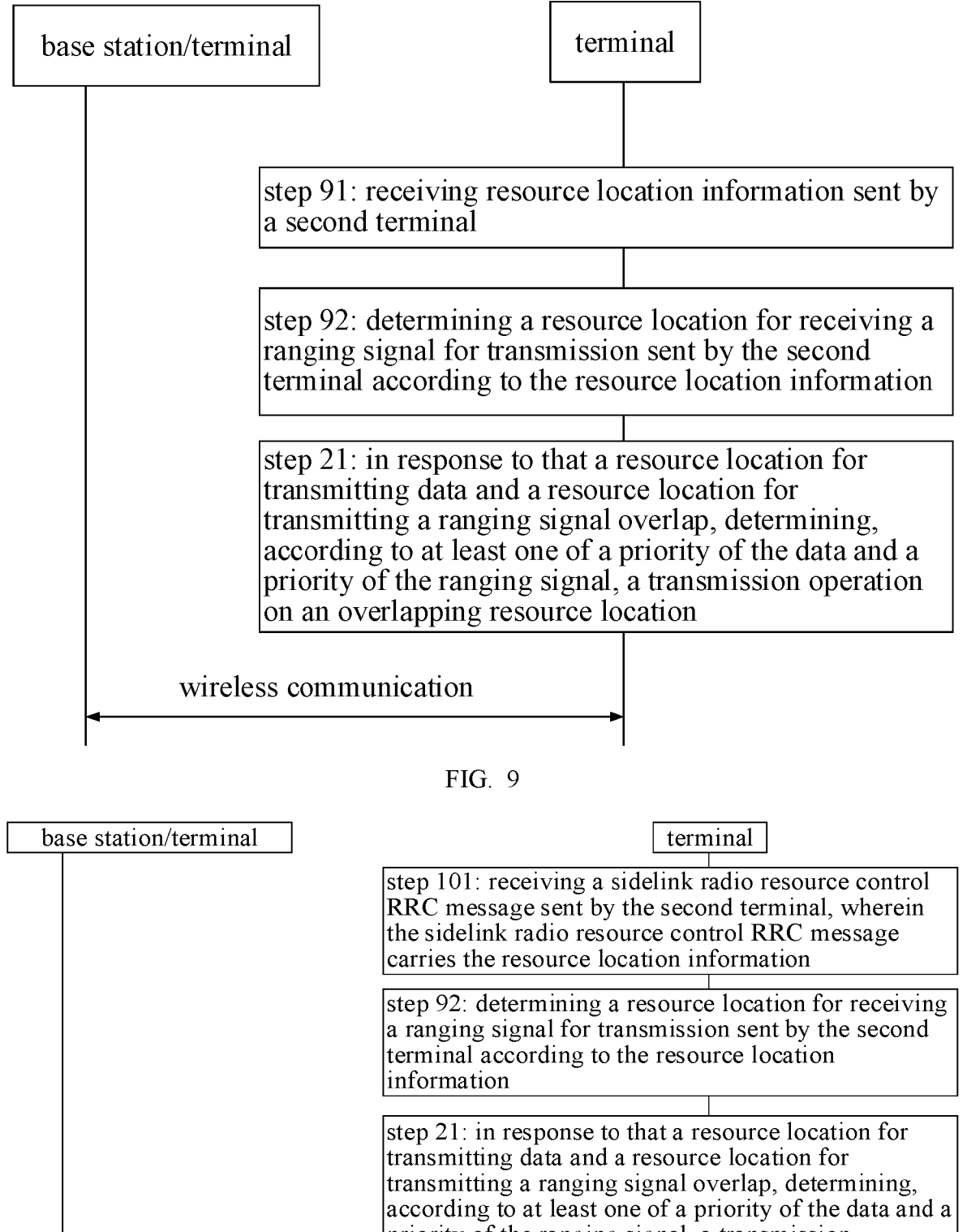
FIG. 9 is a flowchart illustrating a method for wireless transmission according to an embodiment.
FIG. 10 is a flowchart illustrating a method for wireless transmission according to an embodiment.

As shown in FIG. 9, the embodiment provides a method for wireless transmission, wherein the method includes steps 91 and 92:

step 91: resource location information sent by a second terminal is received;

step 92: a resource location for receiving a ranging signal for transmission sent by the second terminal is determined according to the resource location information.

As shown in FIG. 10, the embodiment provides a method for wireless transmission, wherein the method includes step 101:

step 101: a sidelink radio resource control (RRC) message sent by the second terminal is received, wherein the sidelink radio resource control (RRC) message carries the resource location information.

In some embodiments, the resource location information is carried in the radio resource control (RRC) message, which improves the compatibility of the radio resource control (RRC) message.

In order to facilitate the understanding of the embodiments of the technical solution of the present disclosure, the following is an example to further illustrate the disclosed solution:

Example 1: Two terminals for relative positioning are a terminal A and a terminal B.

In the embodiment, a method for wireless transmission is provided, including steps a-f:

step a, a terminal A sends a sidelink radio resource control (RRC) message to a terminal B, where the radio resource control (RRC) message carries information indicating that a ranging signal is sent on a time slot 1.

step b, the terminal B receives that a parameter of a first priority threshold of the ranging signal is 5 and a parameter of a second priority threshold of uplink data is 2 through the radio resource control (RRC) message, and the parameter of the first priority threshold of the ranging signal and the parameter of the second priority threshold of the uplink data are configured by a base station.

step c, the terminal b receives a sending resource indication of the uplink data, indicating that the terminal b sends the ranging signal on the time slot 1.

step d, the terminal b determines that a resource location for sending the uplink data overlaps with a resource location for receiving the ranging signal, and cannot simultaneously send the uplink data and receive or monitor the ranging signal.

step e, logical channels for all uplink data to be sent in the terminal b are as follows: a logical channel 1, with a corresponding priority parameter being 3; a logical channel 2, with a corresponding priority parameter being 5. Thus, the terminal b determines that the logical channel with the highest priority for sending the uplink data is the logical channel 1 with the priority parameter being 3, which is greater than the parameter of the second priority threshold of the uplink data. The priority of the ranging signal, configured by the base station, is 4, which is less than the parameter of the first priority threshold of the ranging signal.

step f, the terminal B preferentially receives or monitors the ranging signal on the time slot 1, rather than transmitting the uplink data.

Figure 11:
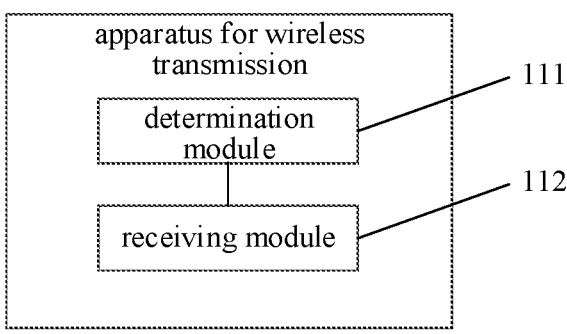
FIG. 11 is a schematic diagram of an apparatus for wireless transmission according to an embodiment.

As shown in FIG. 11, an apparatus for wireless transmission is provided in embodiments of the present disclosure, wherein the apparatus is applicable for a terminal and includes a determination module 111, wherein, the determination module 111 is configured to determine a transmission operation on an overlapping resource location according to at least one of a priority of data and a priority of a ranging signal in response to that a resource location for transmitting the data and a resource location for transmitting the ranging signal overlap.

In an embodiment, the determination module 111 is configured to: the data including at least one of the following:

data transmitted through a Uu interface;

data transmitted through a sidelink.

In an embodiment, the determination module 111 is further configured to:

determine, in response to the priority of the data being lower than a first priority threshold and the priority of the ranging signal being higher than a second priority threshold, that the ranging signal is transmitted on the overlapping resource location and the data is not transmitted on the overlapping resource location;

or, determine, in response to the priority of the data being higher than a first priority threshold and the priority of the ranging signal being lower than a second priority threshold, that the ranging signal is not transmitted at the overlapping resource location and the data is transmitted at the overlapping resource location;

or, determine, in response to the priority of the data being higher than a first priority threshold and the priority of the ranging signal being higher than a second priority threshold, that the ranging signal is transmitted on the overlapping resource location and the data is not transmitted on the overlapping resource location;

or, determine, in response to the priority of the data being higher than a first priority threshold and the priority of the ranging signal being higher than a second priority threshold, that the ranging signal is not transmitted at the overlapping resource location and the data is transmitted at the overlapping resource location;

or, determine, in response to the priority of the data being lower than a first priority threshold and the priority of the ranging signal being lower than a second priority threshold, that the ranging signal is transmitted on the overlapping resource location and the data is not transmitted on the overlapping resource location;

or, determine, in response to the priority of the data being lower than a first priority threshold and the priority of the ranging signal being lower than a second priority threshold, that the ranging signal is not transmitted at the overlapping resource location and the data is transmitted at the overlapping resource location.

In an embodiment, the determination module 111 is further configured to:

determine, in response to the priority of the data being lower than a first priority threshold, that the ranging signal is transmitted on the overlapping resource location and the data is not transmitted on the overlapping resource location;

or, determine, in response to the priority of the data being higher than a first priority threshold, that the ranging signal is not transmitted at the overlapping resource location and the data is transmitted at the overlapping resource location.

In an embodiment, the determination module 111 is further configured to:

determine, in response to the priority of the ranging signal being higher than a second priority threshold, that the ranging signal is transmitted on the overlapping resource location and the data is not transmitted on the overlapping resource location;

or, determine, in response to the priority of the ranging signal being lower than a second priority threshold, that the ranging signal is not transmitted at the overlapping resource location and the data is transmitted at the overlapping resource location.

In an embodiment, the determination module 111 is further configured to:

determine, according to a priority of at least one logical channel used for transmitting the data, the priority of the data.

In an embodiment, the determination module 111 is further configured to that: at least one of the priority of the ranging signal, the first priority threshold, and the second priority threshold is:

received from a base station;

or, obtained from an access stratum (AS) of the terminal;

or, pre-configured.

In an embodiment, the determination module 111 is further configured to:

determine, in response to the priority of the data being lower than the priority of the ranging signal, that the ranging signal is transmitted on the overlapping resource location and the data is not transmitted on the overlapping resource location;

or, determine, in response to the priority of the data being higher than the priority of the ranging signal, that the ranging signal is not transmitted at the overlapping resource location and the data is transmitted at the overlapping resource location.

In an embodiment, the apparatus further includes: a receiving module 112, wherein:

the receiving module 112 is configured to receive resource location information sent by a second terminal;

the determination module 111 is further configured to determine, according to the resource location information, a resource location for receiving a ranging signal for transmission sent by the second terminal.

In an embodiment, the receiving module 112 is further configured to:

receive a sidelink radio resource control (RRC) message sent by the second terminal, wherein the sidelink radio resource control (RRC) message carries the resource location information.

As for the apparatus in the above embodiments, a specific mode for perform operations for each module has been described in detail in the related method embodiments, and will not be described in detail herein.

An embodiment of the present disclosure provides a communication device. The communication device includes:

a processor;

a memory, configured to store instructions executable by the processor;

wherein the processor is configured to implement the method according to any of embodiments of the present disclosure when running the executable instructions.

The processor may include various types of storage medium. The storage medium may be non-transitory computer storage medium and may continue to memorize information stored on the storage medium after power failure of the communication device.

The processor may be coupled with the memory through a bus for reading executable programs stored on the memory.

An embodiment of the present disclosure provides a computer-readable storage medium with a computer executable program stored thereon. The executable program is configured to implement the method according to any of embodiments of the present disclosure when executed by a processor.

As for the elements in the above embodiments, a specific mode for perform operations for each module has been described in detail in the related method embodiments, and will not be described in detail herein.

Figure 12:
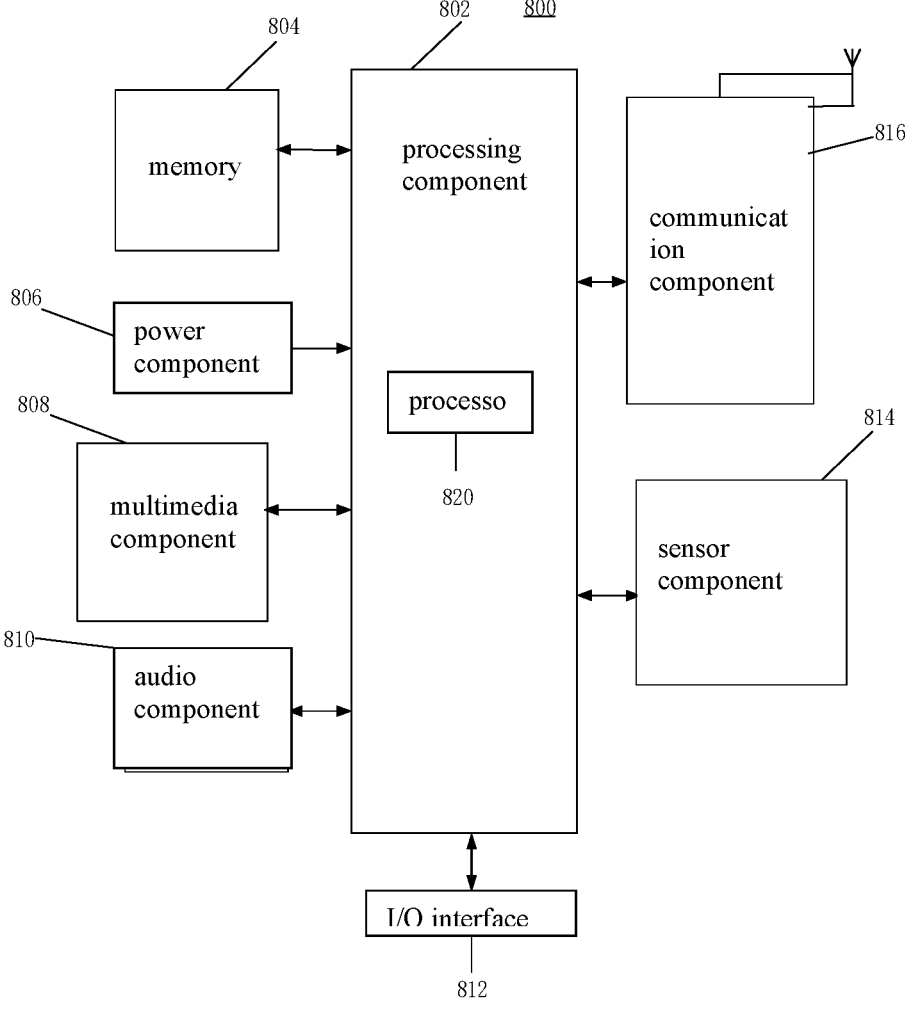
FIG. 12 is a structural schematic diagram illustrating a terminal according to an embodiment.

As shown in FIG. 12, the embodiment of the present disclosure provides a structure of a terminal.

Referring to the terminal 800 shown in FIG. 12, the embodiment provides a terminal 800, the terminal may be a mobile phone, a computer, a digital broadcasting terminal, a message transceiving equipment, a game console, a tablet equipment, a medical equipment, a fitness equipment, or a personal digital assistant.

Referring to FIG. 12, the terminal 800 may include one or more of: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 820 for executing instructions to implement all or a part of the above method. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the terminal 800. Examples of such data include instructions for any application or method operated on the terminal 800 for performing contraction data, phonebook data, messages, pictures, video, etc. The memory 804 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 806 is configured to provide power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 808 includes a front camera and/or a rear camera. When the terminal 800 is in an operation mode, such as a shooting mode or a video mode, the front camera and/or the rear camera may receive external multimedia data. Each front camera and rear camera may be a fixed optical lens system or have a focal length and an optical zoom capability.

The audio component 810 is configured to output and/or input an audio signal. For example, the audio component 810 includes a microphone ("MIC") for receiving an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker for outputting the audio signal.

The I/O interface 812 is configured to provide an interface between the processing component 802 and peripheral interface modules, such as a keyboard, a click wheel, buttons, and the like. These buttons may include, but be not limited to, a home button, a volume button, a start button, and a lock button.

The sensor component 814 includes one or more sensors for providing status assessments of various aspects of the terminal 800. For example, the sensor component 814 may detect an open/closed state of the terminal 800, relative positioning of components, e.g., the display and the keypad of the terminal 800, a position change of the terminal 800 or a component of the terminal 800, a presence or absence of user contraction with the terminal 800, an orientation or an acceleration/deceleration of the terminal 800, and a temperature change of the terminal 800. The sensor component 814 may include a proximity sensor configured to detect the presence of nearby objects without any physical contact. The sensor component 814 may also include an optical sensor, such as a CMOS or CCD image sensor, for use in an imaging application. In some embodiments, the sensor component 214 may also include an acceleration sensor, a gyro sensor, a magnetic sensor, a pressure sensor or a temperature sensor.

The communication component 816 is configured to facilitate communication, wired or wirelessly, between the terminal 800 and other devices. The terminal 800 may access a wireless network based on a communication standard, such as Wi-Fi, 2G, 3G, or a combination thereof. In an embodiment, the communication component 216 receives a broadcast signal or broadcast associated information from an external broadcast management system via a broadcast channel. In an embodiment, the communication component 216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more embodiments, the terminal 800 may be implemented with one or more application specific integrated circuits (ASICs), digital signal processors (DSPs), digital signal processing devices (DSPDs), programmable logic devices (PLDs), field programmable gate arrays (FP-GAs), controllers, micro-controllers, microprocessors, or other electronic components, for performing the above methods.

In an embodiment, there is also provided a non-transitory computer readable storage medium including instructions, such as the memory 804 including the instructions. The instructions may be executed by the processor 820 in the terminal 800 for performing the above method. For example, the non-transitory computer readable storage medium may be a ROM, a RAM, a CD-ROM, a magnetic tape, a floppy disc, an optical data storage device, and the like.

Figure 13:
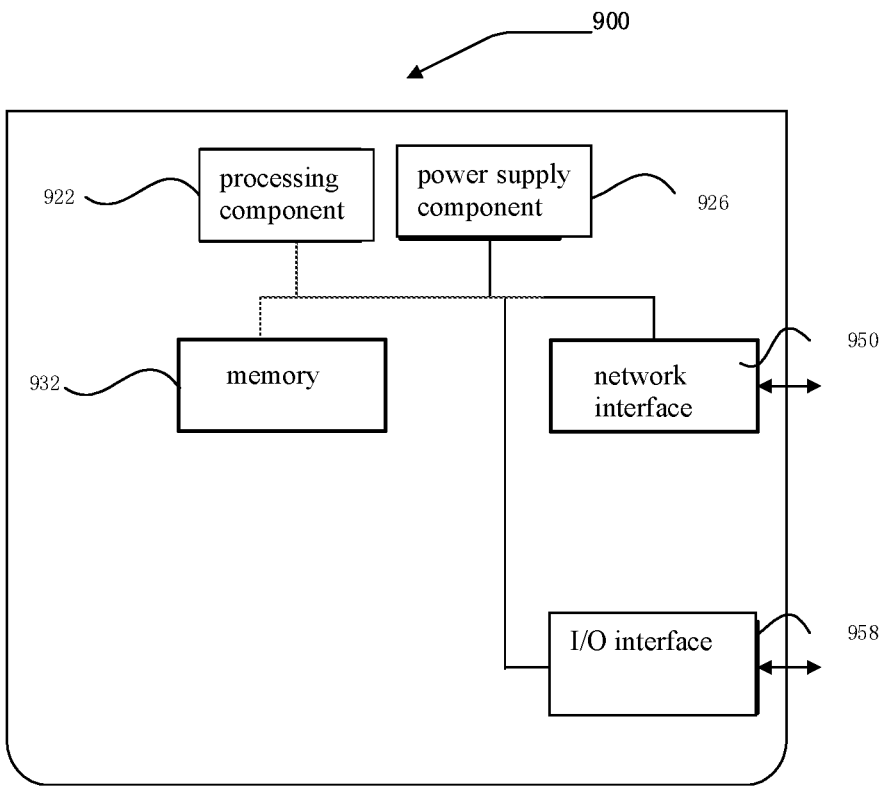
FIG. 13 is a block diagram illustrating a base station according to an embodiment.

As shown in FIG. 13, the embodiment of the present disclosure illustrates a structure of a base station. For example, the base station 900 may be provided as a network device. Referring to FIG. 13, the base station 900 includes a processing component 922, which further include one or more processors, and memory resources represented by the memory 932, which are configured to store instructions executed by the processing component 922, for example, an application. The applications stored in the memory 932 may include one or more modules each of which corresponds to a set of instructions. In addition, the processing component 922 is configured to execute instructions, to execute any of the above methods applied to the base station.

The base station 900 may further include one power supply component 926 configured to execute power management of the base station 900, and one wired or wireless network interface 950 configured to connect the base station 900 to a network, and one input/output (I/O) interface 958. The base station 900 may operate an operating system stored in the memory 932, for example, Windows Server, Mac OS X™, Unix, Linux, FreeBSD™, or the like.

Embodiments of the present disclosure disclose a method for wireless transmission, an apparatus, a communication device, and a storage medium.

According to a first aspect of the embodiments of the present disclosure, a method for wireless transmission, the method is performed by a terminal and includes:

in response to that a resource location for transmitting data and a resource location for transmitting a ranging signal overlap, determining, according to at least one of a priority of the data and a priority of the ranging signal, a transmission operation on an overlapping resource location.

In an embodiment, the data includes at least one of the following:

data transmitted through a Uu interface;

data transmitted through a sidelink.

In an embodiment, the determining, according to at least one of the priority of the data and the priority of the ranging signal, the transmission operation on the overlapping resource location includes:

determining, in response to the priority of the data being lower than a first priority threshold and the priority of the ranging signal being higher than a second priority threshold, that the ranging signal is transmitted on the overlapping resource location and the data is not transmitted on the overlapping resource location;

or, determining, in response to the priority of the data being higher than a first priority threshold and the priority of the ranging signal being lower than a second priority threshold, that the ranging signal is not transmitted at the overlapping resource location and the data is transmitted at the overlapping resource location;

or, determining, in response to the priority of the data being higher than a first priority threshold and the priority of the ranging signal being higher than a second priority threshold, that the ranging signal is transmitted on the overlapping resource location and the data is not transmitted on the overlapping resource location;

or, determining, in response to the priority of the data being higher than a first priority threshold and the priority of the ranging signal being higher than a second priority threshold, that the ranging signal is not transmitted at the overlapping resource location and the data is transmitted at the overlapping resource location;

or, determining, in response to the priority of the data being lower than a first priority threshold and the priority of the ranging signal being lower than a second priority threshold, that the ranging signal is transmitted on the overlapping resource location and the data is not transmitted on the overlapping resource location;

or, determining, in response to the priority of the data being lower than a first priority threshold and the priority of the ranging signal being lower than a second priority threshold, that the ranging signal is not transmitted at the overlapping resource location and the data is transmitted at the overlapping resource location.

In an embodiment, the determining, according to at least one of the priority of the data and the priority of the ranging signal, the transmission operation on the overlapping resource location includes:

determining, in response to the priority of the data being lower than a first priority threshold, that the ranging signal is transmitted on the overlapping resource location and the data is not transmitted on the overlapping resource location;

or, determining, in response to the priority of the data being higher than a first priority threshold, that the ranging signal is not transmitted at the overlapping resource location and the data is transmitted at the overlapping resource location.

In an embodiment, the determining, according to at least one of the priority of the data and the priority of the ranging signal, the transmission operation on the overlapping resource location includes:

determining, in response to the priority of the ranging signal being higher than a second priority threshold, that the ranging signal is transmitted on the overlapping resource location and the data is not transmitted on the overlapping resource location;

or, determining, in response to the priority of the ranging signal being lower than a second priority threshold, that the ranging signal is not transmitted at the overlapping resource location and the data is transmitted at the overlapping resource location.

In an embodiment, the method further includes:

determining, according to a priority of at least one logical channel used for transmitting the data, the priority of the data.

In an embodiment, at least one of the priority of the ranging signal, the first priority threshold, and the second priority threshold is:

received from a base station;

or, obtained from an access stratum (AS) of the terminal;

or, pre-configured.

In an embodiment, the determining, according to at least one of the priority of the data and the priority of the ranging signal, the transmission operation on the overlapping resource location includes:

determining, in response to the priority of the data being lower than the priority of the ranging signal, that the ranging signal is transmitted on the overlapping resource location and the data is not transmitted on the overlapping resource location;

or, determining, in response to the priority of the data being higher than the priority of the ranging signal, that the ranging signal is not transmitted at the overlapping resource location and the data is transmitted at the overlapping resource location.

In an embodiment, the method further includes:

receiving resource location information sent by a second terminal;

determining, according to the resource location information, a resource location for receiving a ranging signal for transmission sent by the second terminal.

In an embodiment, the receiving the resource location information sent by the second terminal includes:

receiving a sidelink radio resource control (RRC) message sent by the second terminal, wherein the sidelink radio resource control (RRC) message carries the resource location information.

According to a second aspect of the embodiments of the present disclosure, an apparatus for wireless transmission is provided, the apparatus is applicable for a terminal and includes a determination module, wherein:

the determination module is configured to determine a transmission operation on an overlapping resource location according to at least one of a priority of data and a priority of a ranging signal in response to that a resource location for transmitting the data and a resource location for transmitting the ranging signal overlap.

In an embodiment, the determination module is configured to: the data including at least one of the following:

data transmitted through a Uu interface;

data transmitted through a sidelink.

In an embodiment, the determination module is further configured to:

determine, in response to the priority of the data being lower than a first priority threshold and the priority of the ranging signal being higher than a second priority threshold, that the ranging signal is transmitted on the overlapping resource location and the data is not transmitted on the overlapping resource location;

or, determine, in response to the priority of the data being higher than a first priority threshold and the priority of the ranging signal being lower than a second priority threshold, that the ranging signal is not transmitted at the overlapping resource location and the data is transmitted at the overlapping resource location;

or, determine, in response to the priority of the data being higher than a first priority threshold and the priority of the ranging signal being higher than a second priority threshold, that the ranging signal is transmitted on the overlapping resource location and the data is not transmitted on the overlapping resource location;

or, determine, in response to the priority of the data being higher than a first priority threshold and the priority of the ranging signal being higher than a second priority threshold, that the ranging signal is not transmitted at the overlapping resource location and the data is transmitted at the overlapping resource location;

or, determine, in response to the priority of the data being lower than a first priority threshold and the priority of the ranging signal being lower than a second priority threshold, that the ranging signal is transmitted on the overlapping resource location and the data is not transmitted on the overlapping resource location;

or, determine, in response to the priority of the data being lower than a first priority threshold and the priority of the ranging signal being lower than a second priority threshold, that the ranging signal is not transmitted at the overlapping resource location and the data is transmitted at the overlapping resource location.

In an embodiment, the determination module is further configured to:

determine, in response to the priority of the data being lower than a first priority threshold, that the ranging signal is transmitted on the overlapping resource location and the data is not transmitted on the overlapping resource location;

or, determine, in response to the priority of the data being higher than a first priority threshold, that the ranging signal is not transmitted at the overlapping resource location and the data is transmitted at the overlapping resource location.

In an embodiment, the determination module is further configured to:

determine, in response to the priority of the ranging signal being higher than a second priority threshold, that the ranging signal is transmitted on the overlapping resource location and the data is not transmitted on the overlapping resource location;

or, determine, in response to the priority of the ranging signal being lower than a second priority threshold, that the ranging signal is not transmitted at the overlapping resource location and the data is transmitted at the overlapping resource location.

In an embodiment, the determination module is further configured to:

determine, according to a priority of at least one logical channel used for transmitting the data, the priority of the data.

In an embodiment, the determination module is further configured to that: at least one of the priority of the ranging signal, the first priority threshold, and the second priority threshold is:

received from a base station;

or, obtained from an access stratum (AS) of the terminal;

or, pre-configured.

In an embodiment, the determination module is further configured to:

determine, in response to the priority of the data being lower than the priority of the ranging signal, that the ranging signal is transmitted on the overlapping resource location and the data is not transmitted on the overlapping resource location;

or, determine, in response to the priority of the data being higher than the priority of the ranging signal, that the ranging signal is not transmitted at the overlapping resource location and the data is transmitted at the overlapping resource location.

In an embodiment, the apparatus further includes: a receiving module, wherein:

the receiving module is configured to receive resource location information sent by a second terminal;

the determination module is further configured to determine, according to the resource location information, a resource location for receiving a ranging signal for transmission sent by the second terminal.

In an embodiment, the receiving module is further configured to:

receive a sidelink radio resource control (RRC) message sent by the second terminal, wherein the sidelink radio resource control (RRC) message carries the resource location information.

According to a third aspect of the embodiments of the present disclosure, a communication device is provided and includes:

a processor;

a memory for storing executable instructions of the processor;

wherein the processor is configured to implement the method described in any embodiment of the present disclosure when running the executable instructions.

According to a fourth aspect of the embodiments of the present disclosure, a computer storage medium is provided, the computer storage medium stores a computer executable program and implements the method described in any of the embodiments of the present disclosure when the executable program is executed by a processor.

In the embodiments of the present disclosure, in response to that the resource location for transmitting data and the resource location for transmitting the ranging signal overlap, the transmission operation on an overlapping resource location is determined according to at least one of a priority of the data and a priority of the ranging signal. Thus, the terminal may receive the ranging signals on the overlapping resource location based on the priority of the data and/or the priority of the ranging signal. Compared to the manner in which the ranging signal cannot be received on the overlapping resource location when the resource location for transmitting the data and the resource location for transmitting the ranging signal overlap, it may reduce failure of the relative positioning between the terminal and the peer terminal caused by the terminal being unable to receive the ranging signal, and improve reliability of the relative positioning between the terminals.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

What is claimed is:

1. A method for wireless transmission, comprising:

determining, by a terminal, according to at least one of a priority of data and a priority of a ranging signal, a transmission operation on an overlapping resource location;

wherein a resource location for transmitting the data and a resource location for transmitting the ranging signal overlap at the overlapping resource location;

wherein determining the transmission operation on the overlapping resource location according to at least one of the priority of the data and the priority of the ranging signal comprises:

in a case where the priority of the data is greater than a priority threshold of the data and that the priority of the ranging signal is greater than a priority threshold of the ranging signal, receiving the ranging signal at the overlapping resource location; and in a case where the priority of the data is greater than the priority threshold of the data and that the priority of the ranging signal is less than the priority threshold of the ranging signal, refraining from receiving the ranging signal at the overlapping resource location.

2. The method according to claim 1, wherein the data comprises at least one of the following:

data transmitted through a Uu interface; and data transmitted through a sidelink.

3. The method according to claim 1, further comprising:

determining, according to a priority of at least one logical channel used for transmitting the data, the priority of the data.

4. The method according to claim 3, wherein a priority parameter of the logical channel is configured by a base station, and the priority of the logical channel is determined by the priority parameter of the logical channel, the higher the value of the priority parameter of the logical channel, the lower the priority of the logical channel.

5. The method according to claim 1, further comprising:

receiving resource location information sent by a second terminal; and determining, according to the resource location information, a resource location for receiving a ranging signal for transmission sent by the second terminal.

6. The method according to claim 5, wherein receiving the resource location information sent by the second terminal comprises:

receiving a sidelink radio resource control (RRC) message sent by the second terminal, wherein the sidelink radio resource control (RRC) message carries the resource location information.

7. The method according to claim 1, wherein the priority of the ranging signal is received from at least one of: a base station, obtained from an access stratum (AS) of the terminal, or pre-configured.

8. A communication device, comprising:

an antenna;

a memory; and a processor, connected to the antenna and the memory respectively, configured to control transmission and reception of the antenna by executing a computer executable instruction stored on the memory, wherein the processor is configured to:

determine, according to at least one of a priority of data and a priority of a ranging signal, a transmission operation on an overlapping resource location, wherein a resource location for transmitting the data and a resource location for transmitting the ranging signal overlap at the overlapping resource location;

in a case where the priority of the data is greater than a priority threshold of the data and that the priority of the ranging signal is greater than a priority threshold of the ranging signal, receive the ranging signal at the overlapping resource location; and in a case where the priority of the data is greater than the priority threshold of the data and that the priority of the ranging signal is less than the priority threshold of the ranging signal, refrain from receiving the ranging signal at the overlapping resource location.

9. The communication device according to claim 8, wherein the data comprises at least one of the following:

data transmitted through a Uu interface; and data transmitted through a sidelink.

10. The communication device according to claim 8, wherein the processor is further configured to:

determine, according to a priority of at least one logical channel used for transmitting the data, the priority of the data.

11. The communication device according to claim 10, wherein a priority parameter of the logical channel is configured by a base station, and the priority of the logical channel is determined by the priority parameter of the logical channel, the higher the value of the priority parameter of the logical channel, the lower the priority of the logical channel.

12. The communication device according to claim 8, wherein the priority of the ranging signal is received from at least one of: a base station, obtained from an access stratum (AS) of the terminal, or pre-configured.

13. The communication device according to claim 8, wherein the processor is further configured to:

receive resource location information sent by a second terminal; and determine, according to the resource location information, a resource location for receiving a ranging signal for transmission sent by the second terminal.

14. The communication device according to claim 13, wherein the processor is further configured to:

receive a sidelink radio resource control (RRC) message sent by the second terminal, wherein the sidelink radio resource control (RRC) message carries the resource location information.

15. A non-transitory computer storage medium, wherein the computer storage medium stores a computer executable instruction, and when the computer executable instruction is executed by a processor, the processor is configured to:

determine, according to at least one of a priority of data and a priority of a ranging signal, a transmission operation on an overlapping resource location; wherein a resource location for transmitting the data and a resource location for transmitting the ranging signal overlap at the overlapping resource location;

in a case where the priority of the data is greater than a priority threshold of the data and that the priority of the ranging signal is greater than a priority threshold of the ranging signal, receive the ranging signal at the overlapping resource location; and in a case where the priority of the data is greater than the priority threshold of the data and that the priority of the ranging signal is less than the priority threshold of the ranging signal, refrain from receiving the ranging signal at the overlapping resource location.

16. The non-transitory computer storage medium of claim 15, wherein the processor is further configured to:

determine, according to a priority of at least one logical channel used for transmitting the data, the priority of the data.

17. The non-transitory computer storage medium of claim 16, wherein a priority parameter of the logical channel is configured by a base station, and the priority of the logical channel is determined by the priority parameter of the logical channel, the higher the value of the priority parameter of the logical channel, the lower the priority of the logical channel.

18. The non-transitory computer storage medium according to claim 15, wherein the priority of the ranging signal is received from at least one of: a base station, obtained from an access stratum (AS) of the terminal, or pre-configured.

19. The non-transitory computer storage medium according to claim 15, wherein the processor is further configured to:

receive resource location information sent by a second terminal; and determine, according to the resource location information, a resource location for receiving a ranging signal for transmission sent by the second terminal.

20. The non-transitory computer storage medium according to claim 19, wherein the processor is further configured to:

receive a sidelink radio resource control (RRC) message sent by the second terminal, wherein the sidelink radio resource control (RRC) message carries the resource location information.

\* \* \* \* \*